UNITED STATES PATENT OFFICE.

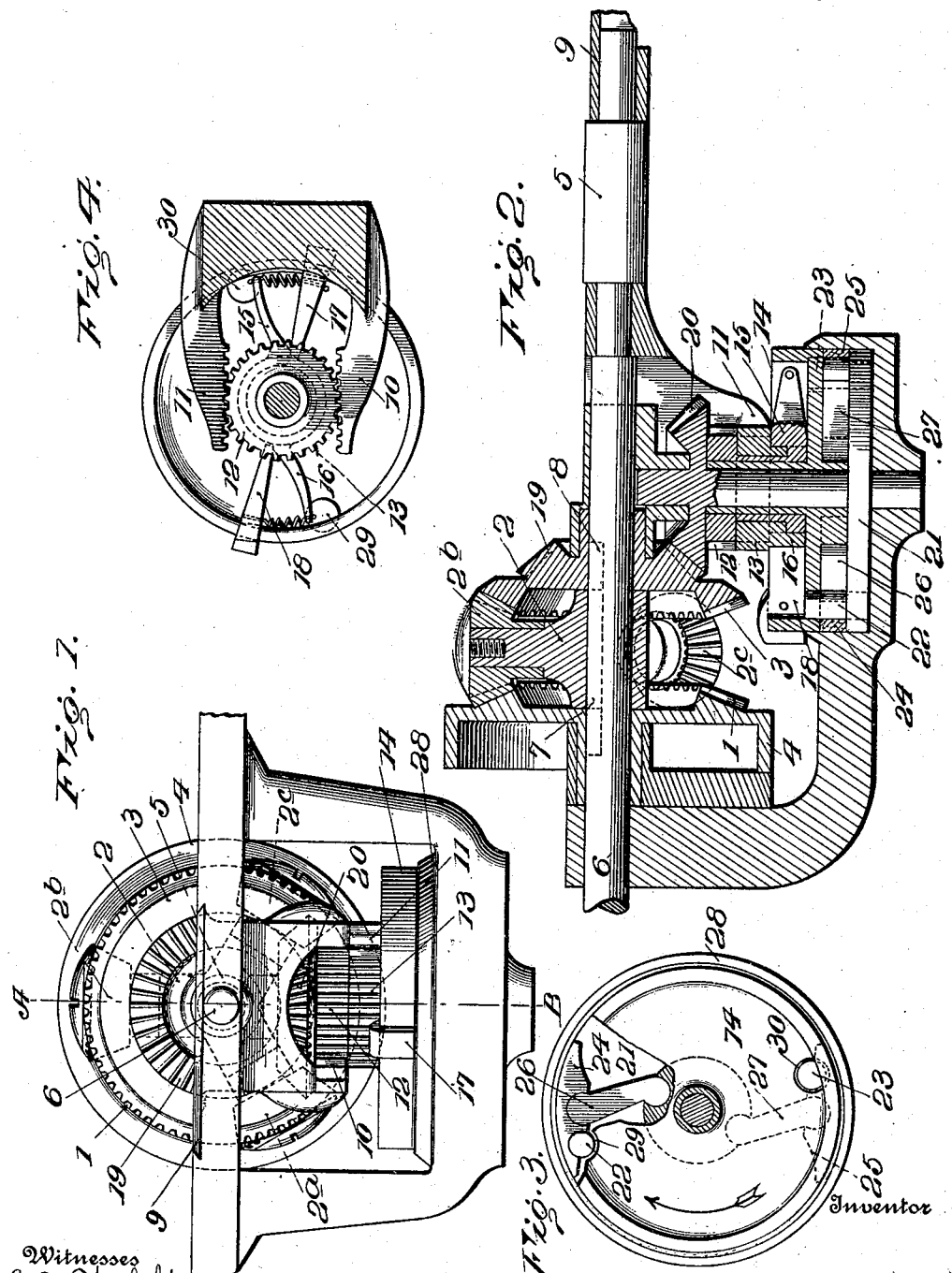

ROBERT CORNELY, OF PARIS, FRANCE.

SEWING-MACHINE.

1,227,119.  Specification of Letters Patent.  Patented May 22, 1917.

Application filed June 6, 1913. Serial No. 772,099.

*To all whom it may concern:*

Be it known that I, ROBERT CORNELY, a citizen of the United States, and a resident of Paris, France, have invented a new and useful Improvement in Sewing-Machines, which is fully set forth in the following specification.

The present invention relates to improvements in sewing, embroidering and like machines and has for its object to provide means whereby the feed of the material and its lateral displacement under the needle or needles are made dependent upon each other.

In the drawings which represent an example only of the invention, Figure 1 is an elevation, Fig. 2 a vertical section of Fig. 1 on line A—B, and Figs. 3 and 4 are details hereafter to be referred to.

Cog wheel 1 of a differential gearing 1, 2, 3 is provided with a ratchet wheel 4 which is driven by the machine in any suitable manner.

Shaft 6 carries the feed roller 5 and is rotated by wheel 2 which carries the planetary wheels $2^a$, $2^b$, $2^c$, by means of a key 7 which engages in a groove 8 of the shaft 6, and this feed of the material takes place at each action of the pawl upon ratchet 4, but the stroke of that feed is reduced by the differential gearing to one half when wheel 3 remains stationary; when on the contrary wheel 3 turns in opposite direction of wheel 1, then the motion of wheel 2 which carries the planetary wheels is reduced, the contrary case takes place when wheel 3 turns in the same direction as wheel 1.

The table plate 9 of the machine, shaft 6 and its feed roller 5 as well as the two toothed bars 10 and 11 secured to said table plate 9 are displayed laterally to the direction of the feed by any suitable means for producing festoons, scallops, or embroideries, either automatically, or by the operator.

The toothed bars 10 and 11 engage from two opposite sides two toothed wheels 12 and 13 and cause them to turn upon a sleeve of a friction wheel 14 in such manner that they always rotate in opposite directions to each other. Each of these wheels 12 and 13 carries a curved lever 15 and 16 which by means of spiral springs draw the friction pawls 17 and 18 toward the foot of said levers 15 and 16.

In consequence of this opposed direction of rotation of these wheels 12 and 13, the friction wheel 14 is always driven by the one or the other of the friction levers 17 or 18 while the other returns backward so that every displacement of table 9 imparts a rotating motion to friction wheel 14 in one direction only. This rotating motion of the friction wheel 14 is transmitted by means of cog wheels 19 and 20 upon the lateral cog wheel 3 of the differential but in opposite direction to that of the driving wheel 1, thus retarding the rotation of wheel 2 which carries the planetary wheels and which at the same time rotates shaft 6 together with its feed roller 5.

The consequence of this is that the greater every displacement of the table 9 which carries the material the more the rotation of friction wheel 14 and of the regulating wheel 3 increases and the more the rotation of wheel 2 which carries the planetary wheels and of its feed roller decreases.

Since the directions of rotation of the regulating cog wheel 3 and of wheel 2 which carries the planetary wheels are the same and since, on account of the feed of the material, the feed roller 5 and wheel 2 have to overcome a greater resistance than said regulating wheel 3 with its friction wheel 14, it may happen that wheel 2 remains stationary and that the whole movement of the driving cog wheel 1 is applied to wheel 3 so that friction wheel 14 would have a tendency of turning in advance of the friction levers 17 and 18 if a stronger resistance than that of feed roller 5 was not opposed to this.

In the present example cog wheel 3 is braked by itself automatically as soon as it begins to transmit a pressure of driving wheel 1 upon friction wheel 14, in the following manner:

Cog wheel 19 which is secured upon cog wheel 3 would then drive cog wheel 20 which is secured upon disk 21, which latter disk 21, by means of two pins 22 and 23 has a tendency of pushing toward the exterior the ends of two levers 26 and 27 pivoted near the center of disk 21 and provided with brakes 24 and 25 which thus exercise a pressure against the interior surface of a stationary sleeve 28. In order that friction wheel 14 remains always in the proper position with regard to the regulating wheel 3, said friction wheel 14 is provided with borings 29 and 30 into which engage the pins 22 and 23 with a little play which is necessary for braking and releasing.

By modifying the proportion of transmission, the motion of displacement of table 9 can be deducted from the motion of the feed of the material not only in fractions, but also in wholes or multiples, or to the contrary, this displacement of table 9 can be added to the displacement of the feed when the regulating wheel 3 is rotated in the same direction as driving wheel 2 which carries the planetary wheels, in order to obtain special embroidery effects.

What I claim is:—

1. In a machine of the character described, a fabric feeding member adapted to be displaced laterally to the direction of feed, means for operating said member to feed the fabric, and means controlled by the lateral displacement of said feeding member and controlling the feed operating means to vary the feed inversely as the lateral displacement.

2. In a machine of the character described, a fabric feeding roller adapted to be displaced laterally to the direction of feed, a differential gear train for driving said roller comprising a drive gear, a driven gear and a feed regulating gear, and means responding to the lateral movements of said feed roller for imparting rotation to said feed regulating gear.

3. In a machine of the character described, a fabric feeding roller adapted to be displaced laterally to the direction of feed, a differential gear train for driving said roller, and means responding to the lateral movements of said feed roller for controlling the movements of one member of said gear train.

4. In a machine of the character described, a fabric feeding roller adapted to be displaced laterally to the direction of feed, a differential gear train for driving said roller comprising a drive gear, a driven gear and a feed regulating gear, means operated by the lateral movements of said roller for driving said feed regulating gear in one direction, and brake means for retarding the rotation of the regulating gear when the resistance offered by the driven gear exceeds that offered by the regulating gear.

5. In a machine of the character described, a fabric feeding roller adapted to be displaced laterally to the direction of feed, a differential gear train for rotating said roller and including a feed controlling gear, driving means for said gear comprising a shaft operatively connected to said gear, a clutch wheel secured to said shaft, a pair of pinions mounted loosely on said shaft and having yielding clutch connections with said wheel, and racks reciprocating with said roller engaging said pinions to drive said wheel and gear in one direction.

6. In a machine of the character described, a fabric feeding roller adapted to be displaced laterally to the direction of feed, a differential gear train for rotating said roller and including a feed controlling gear, driving means for said gear comprising a shaft operatively connected to said gear, a clutch wheel secured to said shaft, a pair of pinions mounted loosely on said shaft and having yielding clutch connections with said wheel, racks reciprocating with said roller engaging said pinions to drive said wheel and gear in one direction, and brakes for increasing the resistance offered by the regulating gear to counterbalance that of the driven gear under abnormal resistances applied to the feed roller.

7. In a machine of the character described, a fabric feeding member adapted to be displaced laterally to the direction of feed, means for operating said member to feed the fabric, and means controlled by the lateral displacement of said feeding member to control the feed of said feeding member.

In testimony whereof I have signed this specification in the presence of two subscribing witnesses.

ROBERT CORNELY.

Witnesses:
HANSON C. COXE,
JOHN BAKER.

Copies of this patent may be obtained for five cents each, by addressing the "Commissioner of Patents, Washington, D. C."